United States Patent
Adachi

(10) Patent No.: US 10,834,780 B2
(45) Date of Patent: Nov. 10, 2020

(54) RADIO TERMINAL AND BASE STATION

(71) Applicant: KYOCERA Corporation, Kyoto (JP)

(72) Inventor: Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 29 days.

(21) Appl. No.: 16/345,754

(22) PCT Filed: Nov. 1, 2017

(86) PCT No.: PCT/JP2017/039616
§ 371 (c)(1),
(2) Date: Apr. 29, 2019

(87) PCT Pub. No.: WO2018/084202
PCT Pub. Date: May 11, 2018

(65) Prior Publication Data
US 2019/0268969 A1    Aug. 29, 2019

(30) Foreign Application Priority Data
Nov. 4, 2016   (JP) .................................. 2016-216768

(51) Int. Cl.
*H04W 88/02* (2009.01)
*H04W 76/27* (2018.01)
*H04W 28/06* (2009.01)
*H04W 72/14* (2009.01)
*H04W 80/02* (2009.01)

(52) U.S. Cl.
CPC ........... *H04W 88/02* (2013.01); *H04W 28/06* (2013.01); *H04W 28/065* (2013.01); *H04W 72/14* (2013.01); *H04W 76/27* (2018.02); *H04W 80/02* (2013.01)

(58) Field of Classification Search
CPC ... H04W 88/02; H04W 28/06; H04W 28/065; H04W 76/27; H04W 72/14; H04W 80/02; H04W 12/02; H04L 63/0485
See application file for complete search history.

(56) References Cited

U.S. PATENT DOCUMENTS

2008/0009289 A1*   1/2008   Kashima ............... H04L 1/1867
                                                                455/436

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 13); 3GPP TS 36.300 v13.5.0; Sep. 2016, pp. 1-313, Valbonne, France.

* cited by examiner

*Primary Examiner* — Curtis A Alia
(74) *Attorney, Agent, or Firm* — Studebaker & Brackett PC

(57) ABSTRACT

A radio terminal according to one embodiment comprises a processor. The processor is configured to: forward a data unit from an RLC layer to a MAC layer prior to receiving an uplink grant from a base station; receive the uplink grant for determining a predetermined transport block size from the base station; generate a transport block by performing concatenation or segmentation on the data unit according to the predetermined transport block size in the MAC layer; and transmit the generated transport block to the base station via a PHY layer. The processor is configured to receive TBS information indicating a minimum guaranteed value of a transport block size from the base station. The predetermined transport block size is a value equal to or larger than the minimum guaranteed value.

16 Claims, 9 Drawing Sheets

RADIO TERMINAL AND BASE STATION

TECHNICAL FIELD

The present disclosure relates to a radio terminal and a base station.

BACKGROUND ART

In a radio protocol structure of a user plane in LTE (Long Term Evolution), each of a PHY (Physical) layer, a MAC (Medium Access Control) layer, an RLC (Radio Link Control) layer, and a PDCP (Packet Data Convergence Protocol) layer executes a prescribed function.

PRIOR ART DOCUMENT

Non-Patent Document

Non Patent Document 1: 3GPP technical specification "TS 36.300 V13.5.0" Sep. 29, 2016

SUMMARY OF THE INVENTION

A radio terminal according to one embodiment comprises a processor. The processor is configured to: forward a data unit from an RLC layer to a MAC layer prior to receiving an uplink grant from a base station; receive the uplink grant for determining a predetermined transport block size from the base station; generate a transport block by performing concatenation or segmentation on the data unit according to the predetermined transport block size in the MAC layer; and transmit the generated transport block to the base station via a PHY layer. The processor is configured to receive TBS information indicating a minimum guaranteed value of a transport block size from the base station. The predetermined transport block size is a value equal to or larger than the minimum guaranteed value.

A base station according to one embodiment is a base station configured to communicate with a radio terminal. The base station comprises a processor. The processor is configured to: transmit TBS information indicating a minimum guaranteed value of a transport block size to the radio terminal; and transmit an uplink grant for determining a predetermined transport block size. The predetermined transport block size is a value equal to or larger than the minimum guaranteed value.

DESCRIPTION OF THE EMBODIMENT

Overview of Embodiment

Figure 1:
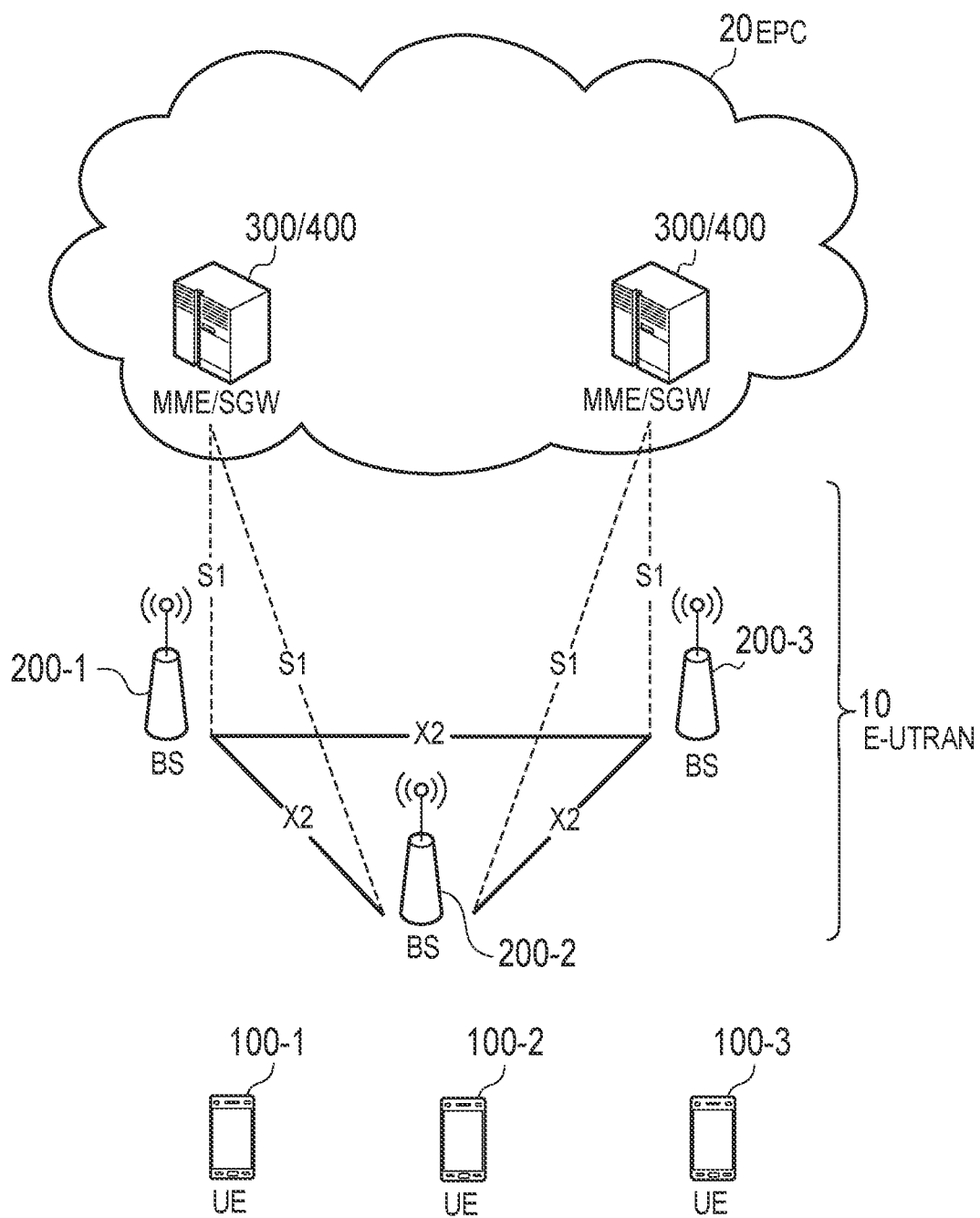
FIG. 1 is a diagram illustrating a configuration of a mobile communication system.

A radio terminal according to one embodiment comprises a processor. The processor is configured to: forward a data unit from an RLC layer to a MAC layer prior to receiving an uplink grant from a base station; receive the uplink grant for determining a predetermined transport block size from the base station; generate a transport block by performing concatenation or segmentation on the data unit according to the predetermined transport block size in the MAC layer; and transmit the generated transport block to the base station via a PHY layer. The processor is configured to receive TBS information indicating a minimum guaranteed value of a transport block size from the base station. The predetermined transport block size is a value equal to or larger than the minimum guaranteed value.

The processor may be configured to perform concatenation or segmentation on the data unit, based on the TBS information, prior to receiving the uplink grant.

The processor may be configured to receive, from the base station, resource allocations indicating an amount of resources being an integral multiple of the minimum guaranteed value.

The TBS information may be determined for each logical channel identifier.

The TBS information may be determined for each traffic type.

The TBS information may be determined for each QoS (Quality of Service).

The processor may be configured to: receive a plurality of pieces of TBS information from the base station, and from among the plurality of pieces of TBS information, select TBS information having a minimum guaranteed value equal to or less than the predetermined transport block size; and select a data unit to be preferentially processed, based on the predetermined information associated with the selected TBS information. The predetermined information may be at least one of a logical channel identifier, a traffic type, and a QoS (Quality of Service).

The uplink grant may include designation information for designating a data unit to be preferentially processed. The designation information may be at least one of a logical channel identifier, a traffic type, and a QoS (Quality of Service).

The processor may be configured to: execute deciphering being a hardware process on a downlink data unit in the MAC layer, instead of a PDCP layer; and execute ciphering being the hardware process on an uplink data unit in the PDCP layer.

A base station according to one embodiment is a base station configured to communicate with a radio terminal. The base station comprises a processor. The processor is configured to: transmit TBS information indicating a minimum guaranteed value of a transport block size to the radio terminal; and transmit an uplink grant for determining a predetermined transport block size. The predetermined transport block size is a value equal to or larger than the minimum guaranteed value.

The processor may be configured to transmit, to the radio terminal, resource allocations indicating an amount of resources being an integral multiple of the minimum guaranteed value.

The processor may be configured to determine the TBS information for each logical channel identifier.

The processor may be configured to determine the TBS information for each traffic type.

The processor may be configured to determine the TBS information for each QoS (Quality of Service).

The processor may be configured to transmit a plurality of pieces of TBS information to the radio terminal. Each of the plurality of pieces of TBS information may be associated with predetermined information.

The predetermined information may be at least one of a logical channel identifier, a traffic type, and a QoS (Quality of Service).

The uplink grant may include designation information for designating a data unit to be preferentially transmitted. The designation information may be at least one of a logical channel identifier, a traffic type, and a QoS (Quality of Service).

Embodiments (Mobile Communication System)

A mobile communication system will be described. FIG. 1 is a diagram showing the configuration of a mobile communication system. An LTE system will be described as an example of the mobile communication system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a communication apparatus (radio terminal). The UE 100 is a mobile communication apparatus. The UE 100 performs radio communication with a cell (later described BS 200). The configuration of the UE 100 will be described later.

The E-UTRAN 10 corresponds to a radio access network. The E-UTRAN 10 includes an BS (BASE STATION) 200. The eNB 200 corresponds to a base station. The BS 200 may be a node capable of performing radio communication with the UE 100. For example, the BS 200 may be a gNB. The BSs 200 may be connected to each other via an X2 interface. The configuration of the BS 200 will be described later.

The BS 200 manages one or a plurality of cells. The BS 200 performs radio communication with the UE 100 that has established connection with cells managed by the BS 200. The BS 200 has a radio resource management (RRM) function, a routing function of user data (hereinafter, simply referred to as "data"), a measurement control function for mobility control and scheduling, and the like. The "cell" may be used as a term indicating the minimum unit of a radio communication area. The "cell" may be used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300 and an SGW (Serving Gateway) 400.

The MME 300 performs, for example, various kinds of mobility control for the UE 100. The SGW 400 performs, for example, data transfer control. The MME 300 and the SGW 400 are connected to the BS 200 via a S1 interface.

Figure 2:
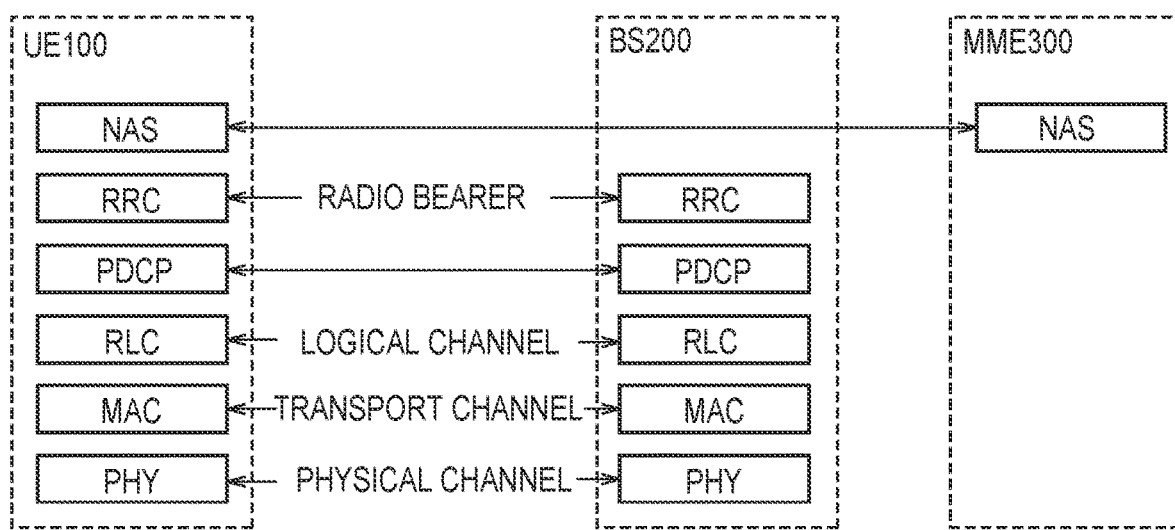
FIG. 2 is a protocol stack diagram of a radio interface.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the BS 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the BS 200, data and control signal are transferred via a transport channel. The MAC layer of the BS 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the BS 200, data and control information are transferred via a logical channel.

The PDCP layer performs header compression/decompression, and encryption (ciphering)/decryption (deciphering).

The RRC layer is defined only in a control plane handling control signal. Between the RRC layer of the UE 100 and the RRC layer of the BS 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the BS 200, the UE 100 is in an RRC connected state. If there is not a connection (RRC connection) between the RRC of the UE 100 and the RRC of the BS 200, the UE 100 is in an RRC idle state.

A non-access stratum (NAS) layer located above the RRC layer performs, for example, session management, mobility management, and the like.

(Radio Terminal)

Figure 3:
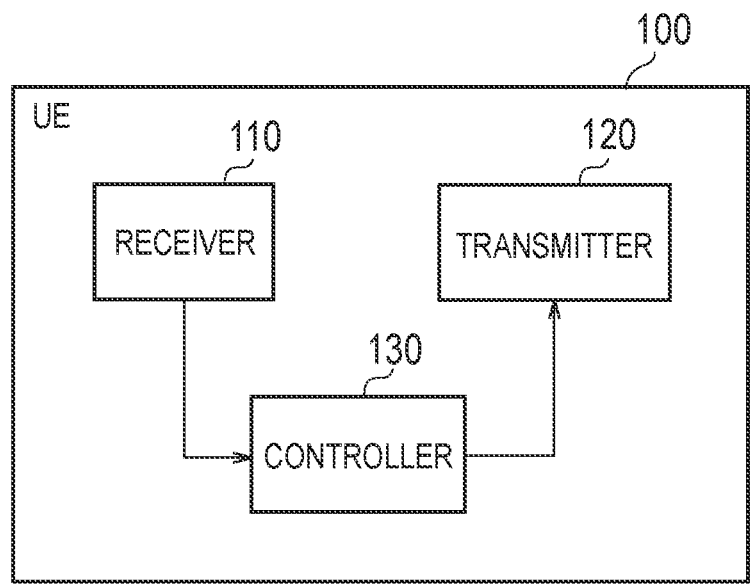
FIG. 3 is a block diagram of a UE 100.

The UE 100 (radio terminal) according to the embodiment will be described. FIG. 3 is a block diagram of the UE 100. As illustrated in FIG. 3, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, and coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100.

For simplicity, a process executed by at least any one of the receiver 110, the transmitter 120, and the controller 130 included in the UE 100 is described herein as a process (operation) executed by the UE 100.

Figure 4:
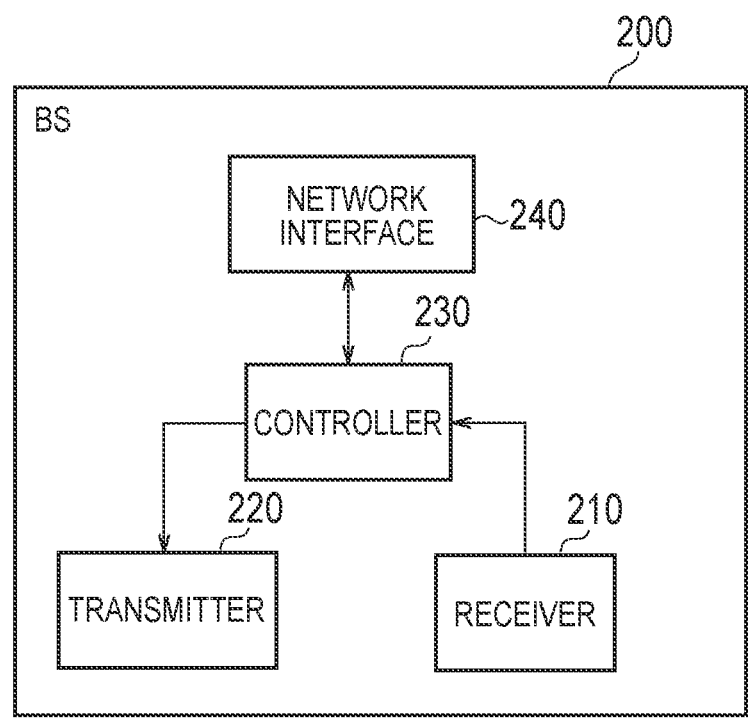
FIG. 4 is a block diagram of a BS 200.

(Base station) The BS 200 (base station) according to the embodiment will be described. FIG. 4 is a block diagram of the BS 200. As illustrated in FIG. 4, the BS 200 includes a receiver 210, a transmitter 220, a controller 230, and a network interface 240. The receiver 210 and the transmitter 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the BS 200. The controller 230 includes a processor and a memory. The memory stores a program to be executed by the processor, and information to be used for a process by the processor. The processor includes a baseband processor and a CPU. The baseband processor performs, for example, modulation and demodulation, coding and decoding, and the like, of the baseband signal. The CPU executes a program stored in the memory to perform various types of processes. The processor executes various types of processes described later, and various types of communication protocols described above.

The network interface 240 is connected to a neighbour BS 200 via the X2 interface. The network interface 240 is connected to the MME 300 and the SGW 400 via the S1 interface. The network interface 240 is used in communication performed on the X2 interface and communication performed on the S1 interface, for example.

For simplicity, a process executed by at least any one of the transmitter 210, the receiver 220, the controller 230, and the network interface 240 included in the BS 200 is described herein as a process (operation) executed by the BS 200.

Operation According to Embodiment

An operation according to an embodiment will be described by using operation examples 1 to 5 as an example.

(A) Operation Example 1

Figure 5:
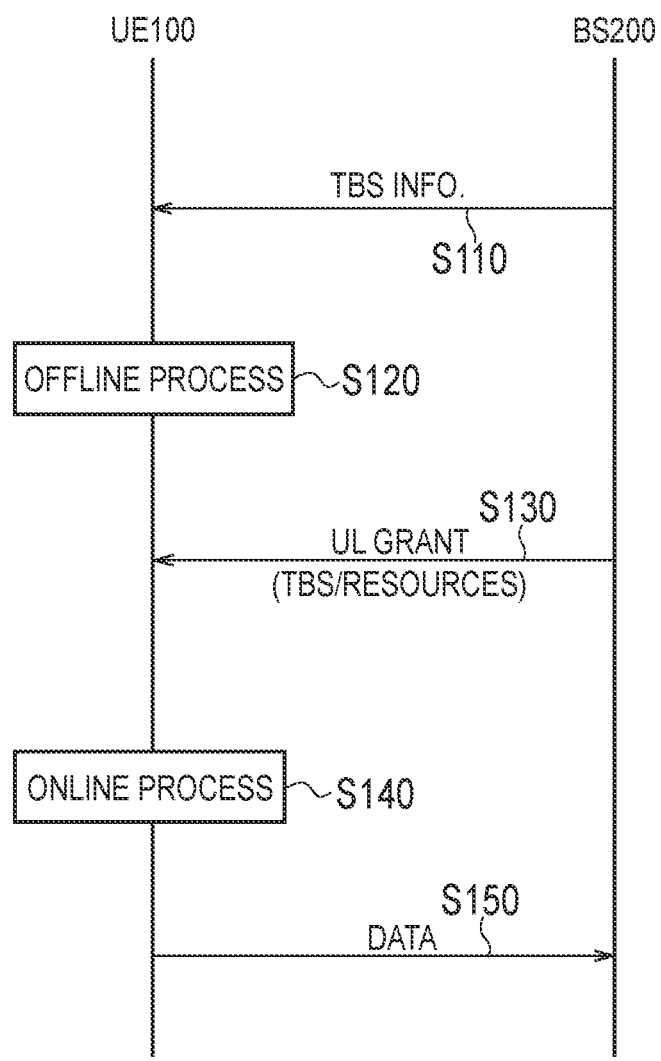
FIG. 5 is a sequence diagram for describing an operation example 1.
Figure 6:
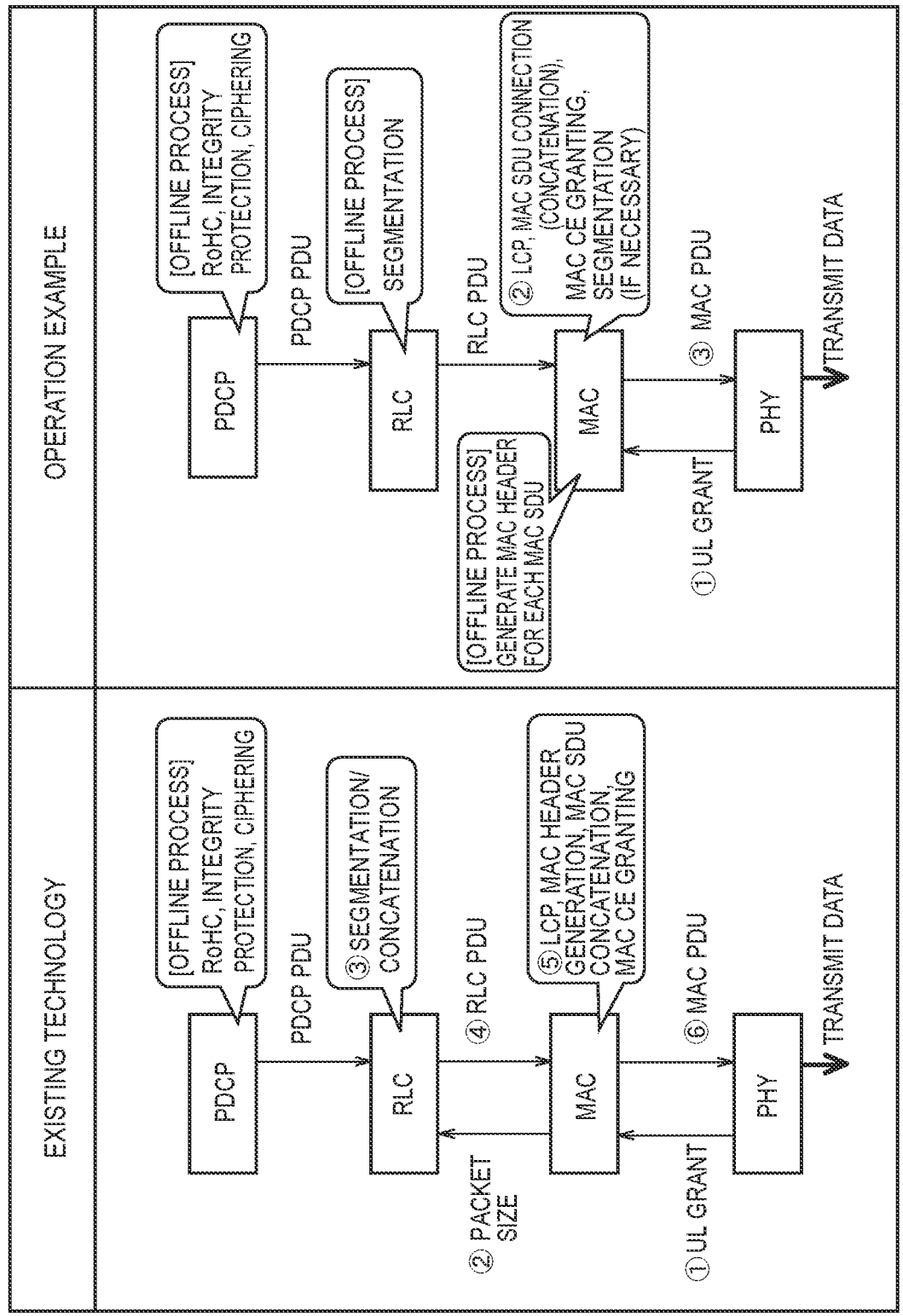
FIG. 6 is a diagram for describing the operation example 1.

The operation example 1 will be described with reference to FIG. 5 and FIG. 6. FIG. 5 is a sequence diagram for describing the operation example 1. FIG. 6 is a diagram for describing the operation example 1.

As illustrated in FIG. 5, in step S110, the BS 200 transmits TBS information (TBS Info.) to the UE 100.

The TBS information indicates a minimum guaranteed value of a transport block size (TBS). In the operation example 1, the BS 200 notifies the UE 100 of the TBS that is equal to or larger than the minimum guaranteed value by an uplink grant (UL grant). The TBS information may be an index of the minimum guaranteed value.

The BS 200 may transmit the TBS information to the UE 100 by dedicated signaling (for example, an RRC reconfiguration message, and DCI (Downlink Control Information)). The BS 200 may transmit the TBS information to the UE 100 by broadcast signaling (for example, an SIB (System Information Block))/group cast signaling.

In step S120, the UE 100 executes an offline process. The offline process is a process executed in advance before receiving the UL grant from the BS 200. The offline process ends before receiving the UL grant from the BS 200.

As illustrated in FIG. 6, in the existing technology, a RoHC (Robust Header Compression) process, an Integrity Protection process, and a Ciphering process are executed in the PDCP layer as the offline process. A data unit (PDCP PDU (Protocol Data Unit)) processed in the PDCP layer is forwarded to the RLC layer. In the RLC layer, the process of the data unit is interrupted until the UE 100 receives the UL grant.

On the other hand, in this operation example, an operation similar to the existing technology is executed as the offline process. Further, as the offline process, segmentation of a data unit (PDCP PDU/RLC SDU (Service Data Unit)) is executed in the RLC layer.

In the RLC layer, prior to receiving the UL grant from the BS 200, segmentation and/or concatenation of the data unit may be executed based on the TBS information. The data unit may be segmented into a size not exceeding the minimum guaranteed value. The data unit may be segmented into the same size as the minimum guaranteed value or a size larger than the minimum guaranteed value.

As the offline process, the data unit (RLC PDU/MAC SDU) processed in the RLC layer is forwarded from the RLC layer to the MAC layer before receiving the UL grant from the BS 200.

As the offline process, in the MAC layer, a MAC header (MAC subheader) for each data unit (MAC SDU) may be generated before the UL grant is received from the BS 200.

Returning to FIG. 5, in step S130, the BS 200 transmits the UL grant to the UE 100. The UL grant is used for the UE 100 to determine a predetermined TBS.

The UL grant may include information indicating a predetermined TBS (for example, a TBS index). The predetermined TBS is a value equal to or more than the minimum guaranteed value.

The UL grant may include resource allocations (Resources) for transmission. The BS 200 may allocate radio resources having a resource amount being an integral multiple of the minimum guaranteed value, to the UE 100. The BS 200 may transmit, to the UE 100, resource allocations indicating a resource amount being an integral multiple of the minimum guaranteed value.

In response to receipt of the UL grant, the UE 100 starts a process of step S140.

In step S140, the UE 100 starts an online process. The online process is a process started in response to the receipt of the UL grant.

As illustrated in FIG. 6, in the existing technology, the PHY layer forwards the UL grant to the MAC layer as the online process. The MAC layer forwards a packet size (for example, the predetermined TBS) to the RLC layer. In the RLC layer, segmentation and/or concatenation of the data unit (PDCP PDU/RLC SDU (Service Data Unit)) is executed according to the packet size. The processed data unit (RLC PDU/MAC SDU) is forwarded from the RLC layer to the MAC layer.

In the MAC layer, the data unit is subjected to an LCP (Logical Channel Prioritization) process, a MAC header generation process, a data unit (MAC SDU) concatenation process, and a MAC CE (Control Element) granting process. As a result, a transport block (MAC PDU) is generated. The transport block is forwarded from the MAC layer to the PHY layer.

On the other hand, in the present operation example, the LCP process, the MAC header generation process, the data unit (MAC SDU) concatenation process, and the MAC CE granting process are executed as the offline processes.

The MAC layer may execute segmentation of the data unit as needed. The MAC layer may perform the segmentation on the data unit so that a transport block to be generated does not exceed the predetermined TBS.

The MAC layer may execute concatenation on the data units as necessary. This concatenation process is not concatenation for generating a transport block to be executed in the existing MAC layer, but concatenation similar to the concatenation process performed in the RLC layer. One data unit (RLC PDU/MAC SDU) concatenated through the concatenation process generates one MAC subheader. On the other hand, in the concatenation process in the existing MAC layer, MAC subheaders as many as concatenated data units (RLC PDUs/MAC SDUs) are generated.

In the MAC layer, a MAC header (MAC subheader) for each data unit (MAC SDU) may be generated as necessary. For example, a MAC header (MAC subheader) may be generated in response to a change in the number of data units by the segmentation/concatenation of data units.

In the MAC layer, before the reception of the UL grant, the concatenation and/or segmentation of the data units may be executed based on the TBS information.

Since the predetermined TBS is equal to or larger than the minimum guaranteed value, if the data unit is segmented into a size smaller than the minimum guaranteed value in the RLC layer, the segmentation process of the data unit can be omitted in the MAC layer.

In the RLC layer, if the data unit is segmented into a size equal to or larger than the minimum guaranteed value, the number of data units to be concatenated is small. As will be described later, if ciphering is executed on individual data units in the MAC layer, an increase in process amount can be reduced. As a result, an increase in overhead can be suppressed.

In the MAC layer, the transport block may be generated by adding padding to the data unit as necessary to conform to the predetermined TBS.

In the MAC layer, by executing each of the above processes, the transport block having a size not exceeding the predetermined TBS is generated. The generated transport block is forwarded from the MAC layer to the PHY layer.

Returning to FIG. 5, in step S150, the UE 100 transmits data (transport block) to the BS 200.

Specifically, the transport block is encoded in the PHY layer. The UE 100 transmits the encoded transport block to the BS 200. As a result, the generated transport block is transmitted to the BS 200 by way of the PHY layer.

The UE 100 transmits the data to the BS 200 by using radio resources (Resources) allocated by the UL grant. If the predetermined TBS is an integral multiple of the minimum guaranteed value, the eNB 200 can efficiently utilize radio resources by allocating radio resources having a resource amount being an integral multiple of the minimum guaranteed value to the UE 100.

As described above, by increasing processes to be executed in the offline process in the UE 100, it is possible to shorten a time period from the reception of the UL grant to the transmission of the data to the BS 200. By executing the segmentation/concatenation on the data units, based on the TBS information, the UE 100 can shorten a time period required for the online process and reduce a process load of the UE 100.

(B) Operation Example 2

Figure 7:
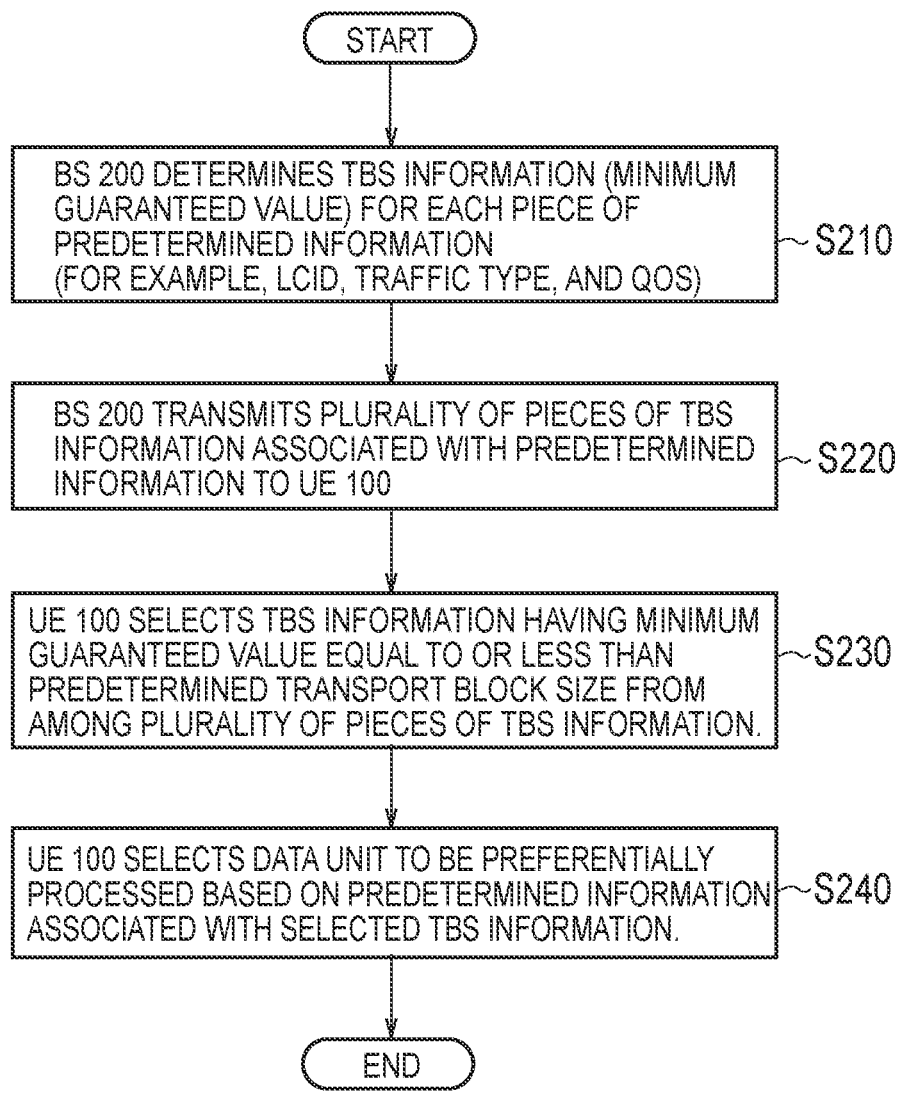
FIG. 7 is a flowchart for describing an operation example 2.

An operation example 2 will be described with reference to FIG. 7. FIG. 7 is a flowchart for describing the operation example 2. Descriptions similar to those described above are omitted.

As illustrated in FIG. 7, in step S210, the BS 200 determines the TBS information (minimum guaranteed value of TBS) for each piece of predetermined information.

The BS 200 may determine the TBS information (minimum guaranteed value) for each logical channel identifier (LCID). For example, the BS 200 may determine the minimum guaranteed value of a transport block to be transmitted for an LCID #1 as x. The BS 200 may determine the minimum guaranteed value of a transport block to be transmitted for an LCID #2 as y.

For example, the BS 200 may determine the TBS information (minimum guaranteed value) for each traffic type. For example, the BS 200 may determine the TBS information according to an allowable delay amount for each traffic. The BS 200 may determine the minimum guaranteed value of a transport block (traffic) whose allowable delay amount is equal to or greater than a predetermined value, as x. The BS 200 may determine the minimum guaranteed value of the transport block (traffic) whose allowable delay amount is less than the predetermined value, as y. For example, the BS 200 may determine the TBS information (minimum guaranteed value) according to a desired bit rate for each traffic. The BS 200 may increase the minimum guaranteed value as a desired bit rate is higher. That is, the BS 200 may associate traffic having a desired bit rate equal to or greater than a predetermined value with the minimum guaranteed value equal to or larger than a predetermined value. The BS 200 may decrease the minimum guaranteed value as a desired bit rate is lower. That is, the BS 200 may associate traffic having a desired bit rate less than a predetermined value with the minimum guaranteed value smaller than a predetermined value. As a result, even if the TBS based on the UL grant is small, the UE 100 can transmit traffic satisfying the desired bit rate because the TBS is equal to or higher than the minimum guaranteed value.

The BS 200 may determine the TBS information (minimum guaranteed value) for each QoS (Quality of Service). For example, the BS 200 may determine the TBS information according to a QoS class (a priority level, a packet delay, and a packet loss rate). For example, the BS 200 may decrease the minimum guaranteed value as the priority is higher. That is, the BS 200 may associate traffic having a high priority with the minimum guaranteed value smaller than a predetermined value. The BS 200 may increase the minimum guaranteed value as the priority is lower. That is, the BS 200 may associate traffic having a low priority with the minimum guaranteed value equal to or more than a predetermined value. As a result, even if the TBS based on the UL grant is small, the UE 100 can highly likely transmit the traffic having a high priority without a need of performing the segmentation based on the online process. As a result, the transmission delay of the traffic having a high priority can be reduced.

The BS 200 associates the predetermined information with the determined TBS information. The BS 200 may generate a TBS list indicating the association between the predetermined information and the TBS information. If the TBS information is determined for each QoS, the BS 200 may associate the QCI (QoS Class Identifier) with the TBS information.

The BS 200 may associate the TBS information with one type of predetermined information. The BS 200 may associate the TBS information with a plurality of types of predetermined information (such as LCID and QoS).

In step S220, the BS 200 transmits a plurality of pieces of TBS information (for example, the TBS list) associated with the predetermined information, to the UE 100. The UE 100 receives the plurality of pieces of TBS information. Step S220 corresponds to step S110.

The UE 100 may execute a process of data units, based on the predetermined information associated with the TBS information. For example, the UE 100 may perform the segmentation (concatenation) on the data unit corresponding to the predetermined QoS, based on the minimum guaranteed value made to correspond to the predetermined QoS (see S120).

In step S230, the UE 100 selects the TBS information having the minimum guaranteed value equal to or less than the predetermined TBS, out of the plurality of pieces of TBS information. For example, the UE 100 selects the TBS information having the minimum guaranteed value equal to or less than the predetermined TBS indicated by the UL grant.

If the minimum guaranteed value is larger than the predetermined TBS, the size of the data unit may be possibly larger than the predetermined TBS. If the size of the data unit is larger than the predetermined TBS, the data unit should be segmented. The UE 100 can avoid the segmentation of the data unit by selecting the TBS information having the minimum guaranteed value equal to or less than the predetermined TBS.

In step S240, based on the TBS list, the UE 100 selects a data unit to be preferentially processed based on the predetermined information (LCID/traffic type/QoS) associated with the selected TBS information.

If an LCID is associated with the selected TBS information, the UE 100 selects the data unit made to correspond to the associated LCID as a data unit to be processed. If a traffic type is associated with the selected TBS information, the UE 100 selects the data unit made to correspond to the associated traffic type as a data unit to be processed. If a QoS is associated with the selected TBS information, the UE 100 selects the data unit made to correspond to the associated QoS as a data unit to be transmitted.

The UE 100 preferentially processes the selected data unit (see S140). The UE 100 preferentially transmits the processed data unit to the BS 200.

(C) Operation Example 3

Figure 8:
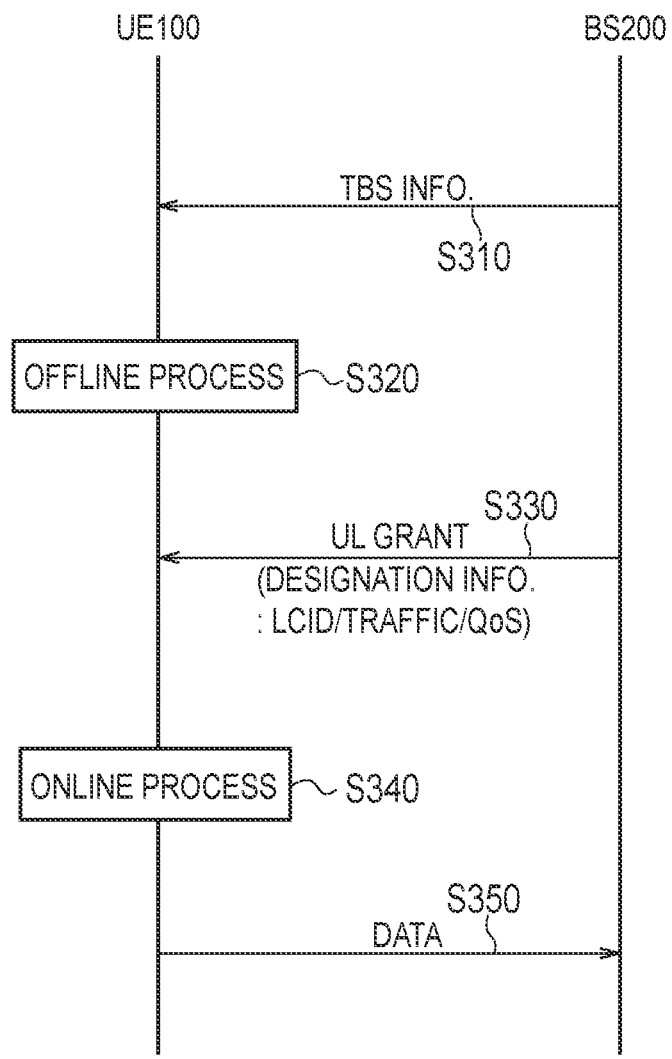
FIG. 8 is a sequence diagram for describing an operation example 3.

An operation example 3 will be described with reference to FIG. 8. FIG. 8 is a sequence diagram for describing the operation example 3. Descriptions similar to those described above are omitted.

In FIG. 8, steps S310 and S320 correspond to steps S110 and S120.

In step S330, the BS 200 transmits the UL grant to the UE 100. The UL grant may include designation information (Designation Info.) for designating the data unit to be processed preferentially.

The designation information is, for example, at least one of the LCID, the traffic type, and the QoS (or the QCI).

In step S340, the UE 100 processes the data unit, based on the designation information.

If a predetermined LCID (for example, LCID #1) is designated by the designation information, the UE 100 preferentially processes the data unit associated with the predetermined LCID.

If a predetermined traffic is designated by the designation information, the UE 100 preferentially processes the data unit associated with the predetermined traffic.

If a predetermined QoS is designated by the designation information, the UE 100 preferentially processes the data unit associated with the predetermined QoS.

The UE 100 can preferentially transmit the data unit processed preferentially.

The UE 100 may prioritize the preferential process based on the designation information over the preferential process based on the LCP process. That is, the UE 100 may preferentially allocate radio resources to the logical channel of the data unit based on the designation information. For the remaining data units, the UE 100 may allocate radio resources to the logical channels according to the LCP process. As a result, the UE 100 can process (transmit) the data unit with a priority different from the priority based on the LCP process. As a result, the BS 200 (network) can freely change an order of priority of the data units.

Step S350 corresponds to step S150.

(D) Operation Example 4

Figure 9:
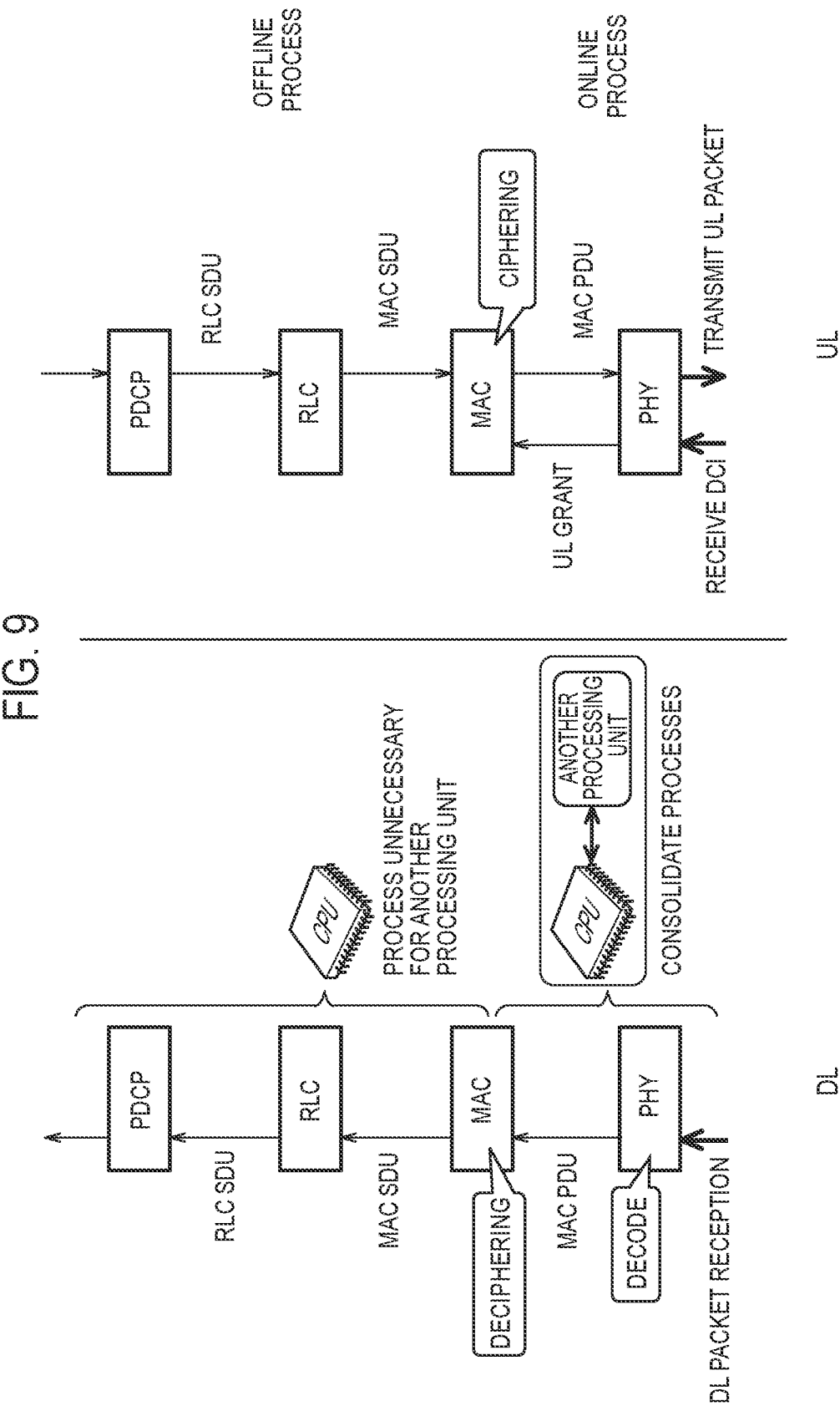
FIG. 9 is a diagram for describing an operation example 4.

An operation example 4 will be described with reference to FIG. 9. FIG. 9 is a diagram for describing the operation example 4.

As illustrated in FIG. 9 (left diagram), if receiving a downlink packet (DL packet) from the BS 200, the UE 100 decodes the DL packet in the PHY layer by a processing unit different from a CPU. The decoding is a hardware process.

The decoded DL packet (data unit: MAC PDU) is forwarded from the PHY layer to the MAC layer.

In the MAC layer, deciphering of the data unit (MAC PDU) from the PHY layer is executed. That is, in the MAC layer, the data unit is deciphered (decoded) by a process unit different from the CPU. The deciphering is a hardware process.

In the MAC layer, instead of the PDCP layer, the deciphering (decoding) is executed. Deciphering in the PDCP layer is omitted. Therefore, in a process in the MAC layer and after the MAC layer, it is possible to process the data unit only with the CPU. That is, the process in the MAC layer and in a layer after the MAC layer is a software process.

If the hardware process is executed in each of the PHY layer and the PDCP layer, the hardware process, the software process, and the hardware process are executed in this order. Compared to this case, if the hardware process is executed collectively in the PHY layer and the MAC layer, the process load of the UE 100 can be reduced.

Also in the uplink, the UE 100 may similarly perform the ciphering (encryption) in the MAC layer.

As illustrated in FIG. 9 (right diagram), in the PDCP layer, the ciphering (hardware process) is omitted.

In the MAC layer, the ciphering is executed on the uplink data unit.

The UE 100 may execute the ciphering on the transport block (MAC PDU) generated in the MAC layer (online process). The UE 100 may execute the ciphering on the data unit (MAC SDU) before receiving the UL grant (DCI) from the eNB 200 (offline process). For example, if the minimum guaranteed value is notified (set), the UE 100 may can transmit the data unit (MAC SDU) without the segmentation, so that the UE 100 may execute the ciphering in the offline process.

Thereafter, the hardware process (encoding) is executed in the PHY layer. Consequently, the process load of the UE 100 can be reduced.

Similarly to the UE 100, the eNB 200 may omit the ciphering/deciphering in the PDCP layer. The eNB 200 may execute the ciphering/deciphering in the MAC layer.

(E) Operation Example 5

Figure 10:
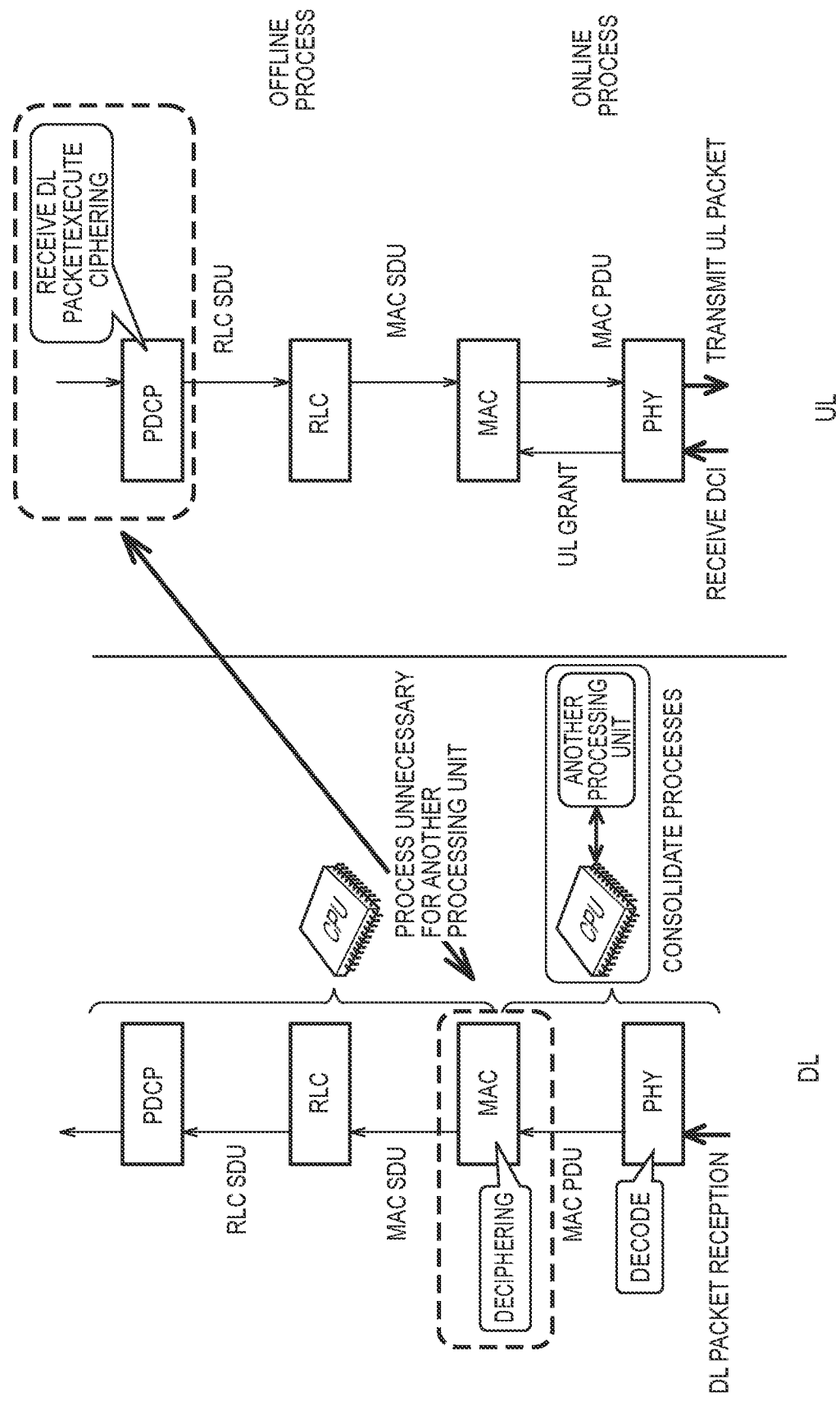
FIG. 10 is a diagram for describing an operation example 5.

An operation example 5 will be described with reference to FIG. 10. FIG. 10 is a diagram for describing the operation example 5.

As illustrated in FIG. 10 (left diagram), as in the operation example 4, the UE 100 may execute the deciphering on a downlink data unit in the MAC layer, instead of the PDCP layer.

On the other hand, the UE 100 may execute the ciphering on an uplink data unit, in the PDCP layer. Since the ciphering is executed as the offline process, a delay can be reduced from the receipt to the transmission of the UL grant.

Similar to the UE 100, the eNB 200 may execute the deciphering on an uplink data unit, in the MAC layer. On the other hand, the eNB 200 may perform the ciphering on a downlink data unit in the PDCP layer.

Other Embodiments

The contents of the present application are described according to the above-described embodiment, but it should not be understood that the discussion and the drawings constituting a part of this disclosure limit the contents of the present application. From this disclosure, various alternative embodiments, examples, and operational technologies will become apparent to those skilled in the art.

The operations (operation examples) according to the above-described embodiment may be combined to be executed, where appropriate. In each of the above-described sequences, all of the operations may not necessarily be an essential configuration. For example, in each of the sequences, only some of the operations may be executed.

For example, the BS 200 may determine whether or not to cause the UE 100 to execute the operations of the operation example 4 (or the operation example 5) according to the capability of the UE 100. For example, the UE 100 can transmit capability information indicating whether or not the ciphering/deciphering in the MAC layer is possible, to the BS 200. The BS 200 can make a determination, based on the capability information.

If the UE 100 is capable of deciphering in the MAC layer, the BS 200 may transmit, to the UE 100, information for instructing the operation of the operation example 4 (or the operation example 5). The BS 200 may transmit, to the UE 100, the information for instructing the operation of the operation example 5 if the UE 100 is capable of deciphering in the MAC layer and is not capable of an ciphering operation in the MAC layer. The BS 200 may omit transmission of the information for instructing the operations of the operation example 4 or 5 if the UE 100 is not capable of ciphering/deciphering in the MAC layer. The BS 200 may transmit explicit information for instructing the ciphering/deciphering in the PDCP layer.

The BS 200 may transmit, to the UE 100, information for instructing by dedicated signaling (such as an RRC reconfiguration message and DCI (Downlink Control Information)). The BS 200 may transmit, to the UE 100, the information for instructing by broadcast signaling (for example, an SIB (System Information Block))/group cast signaling. Based on the information for instructing, the UE 100 can determine whether or not to execute the ciphering/deciphering in the MAC layer or in the PDCP layer.

Although not particularly mentioned in the above-described embodiment, a program for causing a computer to execute each process performed by any one of the above-described nodes (such as the UE 100 and the BS 200) may be provided. The program may be recorded on a computer-readable medium. If the computer-readable medium is used, it is possible to install the program in a computer. Here, the computer-readable medium recording therein the program may be a non-transitory recording medium. The non-transitory recording medium is not particularly limited; the non-transitory recording medium may include a recording medium such as a CD-ROM or a DVD-ROM, for example.

Alternatively, a chip may be provided which includes: a memory for storing a program for performing each process performed by either the UE 100 or the BS 200; and a processor for executing the program stored in the memory.

In the above-described embodiment, the LTE system is described as an example of the mobile communication system; however, the LTE system is not an exclusive example, and the content according to the present application may be applied to a system other than the LTE system.

The entire content of Japanese Patent Application No. 2016-216768 (filed on Nov. 4, 2016) is incorporated in the present specification by reference.

The invention claimed is:

1. A radio terminal, comprising:
a processor, wherein
the processor is configured to:
forward a data unit from an RLC layer to a MAC layer prior to receiving an uplink grant from a base station;
receive the uplink grant for determining a predetermined transport block size from the base station;
generate a transport block by performing concatenation or segmentation on the data unit according to the predetermined transport block size in the MAC layer; and
transmit the generated transport block to the base station via a PHY layer,
the processor is configured to receive TBS information indicating a minimum guaranteed value of a transport block size from the base station, and
the predetermined transport block size is a value equal to or larger than the minimum guaranteed value.

2. The radio terminal according to claim 1, wherein the processor is configured to perform concatenation or segmentation on the data unit, based on the TBS information, prior to receiving the uplink grant.

3. The radio terminal according to claim 1, wherein the processor is configured to receive, from the base station, resource allocations indicating an amount of resources being an integral multiple of the minimum guaranteed value.

4. The radio terminal according to claim 1, wherein the TBS information is determined for each logical channel identifier.

5. The radio terminal according to claim 1, wherein the TBS information is determined for each traffic type.

6. The radio terminal according to claim 1, wherein the TBS information is determined for each QoS (Quality of Service).

7. The radio terminal according to claim 1, wherein the processor is configured to:
receive a plurality of pieces of TBS information from the base station, and from among the plurality of pieces of TBS information, select TBS information having a minimum guaranteed value equal to or less than the predetermined transport block size; and
select a data unit to be preferentially processed, based on the predetermined information associated with the selected TBS information, and the predetermined information is at least one of a logical channel identifier, a traffic type, and a QoS (Quality of Service).

8. The radio terminal according to claim 1, wherein the uplink grant includes designation information for designating a data unit to be preferentially processed, and
the designation information is at least one of a logical channel identifier, a traffic type, and a QoS (Quality of Service).

9. The radio terminal according to claim 1, wherein the processor is configured to:
execute deciphering being a hardware process on a downlink data unit in the MAC layer, instead of a PDCP layer; and
execute ciphering being the hardware process on an uplink data unit in the PDCP layer.

10. A base station configured to communicate with a radio terminal, comprising:
a processor, wherein
the processor is configured to:
transmit TBS information indicating a minimum guaranteed value of a transport block size to the radio terminal; and
transmit an uplink grant for determining a predetermined transport block size, and
the predetermined transport block size is a value equal to or larger than the minimum guaranteed value.

11. The base station according to claim 10, wherein the processor is configured to transmit, to the radio terminal, resource allocations indicating an amount of resources being an integral multiple of the minimum guaranteed value.

12. The base station according to claim 10, wherein the processor is configured to determine the TBS information for each logical channel identifier.

13. The base station according to claim 10, wherein the processor is configured to determine the TBS information for each traffic type.

14. The base station according to claim 10, wherein the processor is configured to determine the TBS information for each QoS (Quality of Service).

15. The base station according to claim 10, wherein the processor is configured to transmit a plurality of pieces of TBS information to the radio terminal,
each of the plurality of pieces of TBS information is associated with predetermined information, and
the predetermined information is at least one of a logical channel identifier, a traffic type, and a QoS (Quality of Service).

16. The base station according to claim 10, wherein the uplink grant includes designation information for designating a data unit to be preferentially transmitted, and
the designation information is at least one of a logical channel identifier, a traffic type, and a QoS (Quality of Service).

* * * * *